United States Patent
Horiguchi

(10) Patent No.: US 7,804,627 B2
(45) Date of Patent: Sep. 28, 2010

(54) IMAGE READING DEVICE

(75) Inventor: Yasuyuki Horiguchi, Osaka (JP)

(73) Assignee: Kyocera Mita Corporation (JP)

( * ) Notice: Subject to any disclaimer, the term of this patent is extended or adjusted under 35 U.S.C. 154(b) by 950 days.

(21) Appl. No.: 11/643,253

(22) Filed: Dec. 21, 2006

(65) Prior Publication Data
US 2007/0146818 A1 Jun. 28, 2007

(30) Foreign Application Priority Data
Dec. 22, 2005 (JP) ............................. 2005-369969

(51) Int. Cl.
*H04N 1/04* (2006.01)

(52) U.S. Cl. ..................... 358/488; 358/486; 358/497; 358/475; 358/474

(58) Field of Classification Search ................ 358/475, 358/509, 497, 494, 474, 505, 488, 486; 399/220, 399/221; 355/67–69; 250/227.11; 362/800
See application file for complete search history.

(56) References Cited

U.S. PATENT DOCUMENTS

| | | | |
|---|---|---|---|
| 6,947,184 B1 * | 9/2005 | Onishi et al. ................ | 358/472 |
| 7,209,702 B2 * | 4/2007 | Kohchi et al. ............... | 399/377 |
| 7,330,692 B2 * | 2/2008 | Kohchi et al. ............... | 399/376 |
| 2005/0129436 A1 | 6/2005 | Kohchi et al. | |
| 2007/0273935 A1 * | 11/2007 | Ide et al. ..................... | 358/474 |

FOREIGN PATENT DOCUMENTS

| | | |
|---|---|---|
| CN | 1619430 A | 5/2005 |
| JP | 593970 | 4/1993 |
| JP | 05-207239 | 8/1993 |

* cited by examiner

*Primary Examiner*—Cheukfan Lee
(74) *Attorney, Agent, or Firm*—Gerald E. Hespos; Michael J. Porco

(57) ABSTRACT

An image reading device is provided with a contact glass on which a document is to be placed; a group light source in which a plurality of point light sources are linearly arrayed; and a light source unit having the group light source mounted therein and adapted to optically scan a document surface via a contact glass with reading lights emitted from the group light source. The group light source is constructed such that at least one of the plurality of point light sources is a detecting light source for emitting a detection light toward the contact glass to detect the presence or absence of a document on the contact glass.

10 Claims, 6 Drawing Sheets

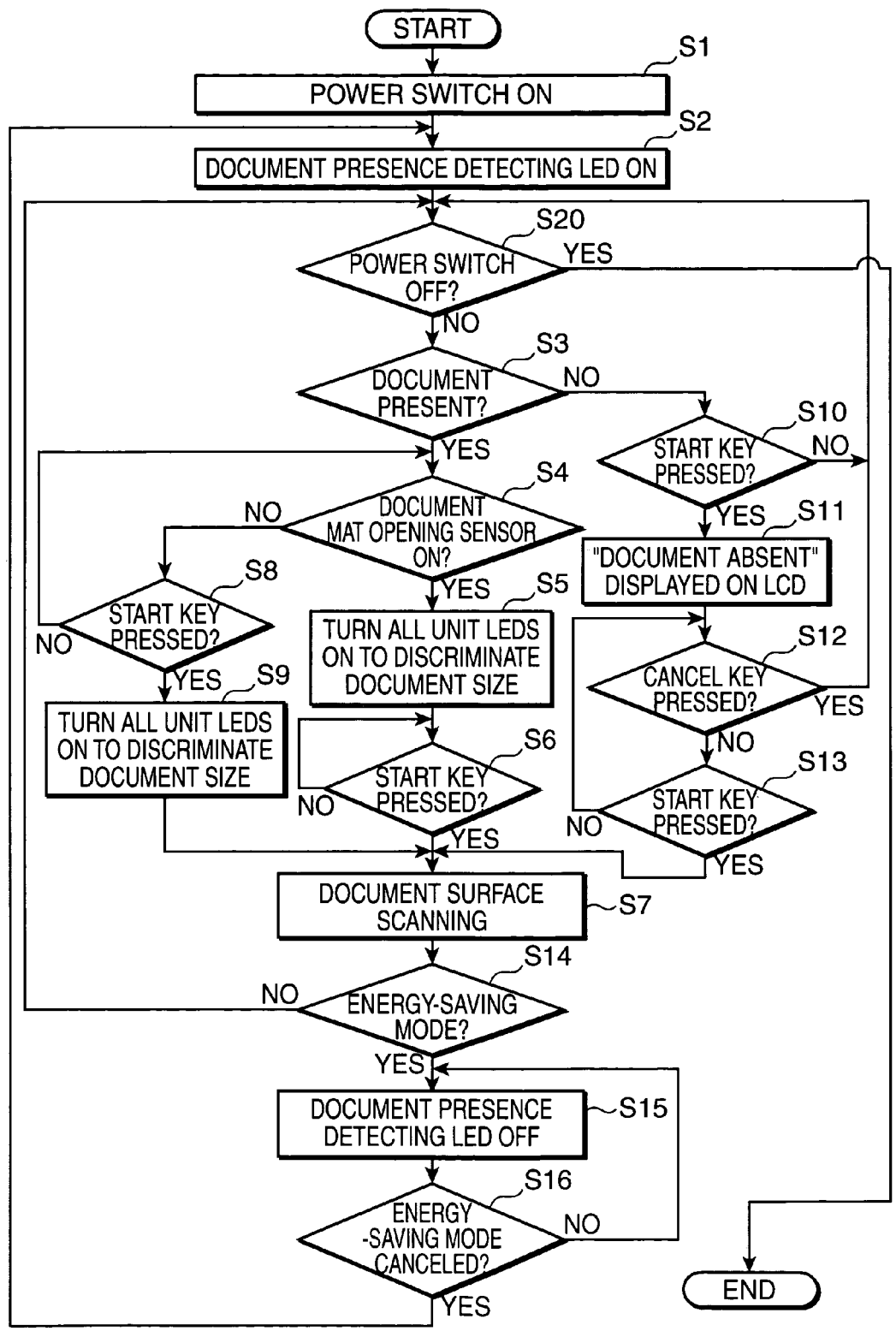

US 7,804,627 B2

IMAGE READING DEVICE

BACKGROUND OF THE INVENTION

1. Field of the Invention

The present invention relates to an image reading device constructed such that light from a light source is emitted via a contact glass to a document surface of a document placed on the contact glass and a resulting reflected light is inputted to a specified image sensor to read an image.

2. Description of the Related Art

There has been conventionally known an image reading device as disclosed in Japanese Unexamined Patent Publication No. H05-207239. This image reading device is constructed such that a document is placed on a contact glass (referred to as a platen glass in this publication), a document surface of this document is scanned with light from a light source via the contact glass, and this scanning light is inputted to a CCD image sensor to read this image information by converting it into a digital electrical signal. A tubular light source such as a xenon lamp or a cathode-ray lamp is employed as the light source as can be seen in FIG. 1 of this publication. A document mat (referred to as a platen cover in this publication) openable and closable relative to the contact glass for pressing a document is also provided, wherein the document is placed on the contact glass with the document mat opened and, thereafter, an image reading operation is performed by moving the light source with the document mat closed.

In such an image reading device, when the document is placed on the contact glass with the document mat opened and the document is successively closed to press the document, the tubular light source is turned on in synchronism with the document mat closing operation, and the light from this tubular light source reflected by the document is inputted to the CCD image sensor, whereby the CCD image sensor detects the size of the document.

However, the image reading device of the above prior art has a problem that the light emitted from the tubular light source comes into an operator's eyes and is too bright since the tubular light source is turned on every time the document mat is closed. Since the tubular light source is turned on in synchronism with the document mat closing operation, it is, after all, turned on twice for one document reading operation when the document mat is closed after the document is placed on the contact glass and when the document mat is closed after the document is removed from the contact glass following the end of the image reading operation. This considerably influences the operator's eyes (i.e. the operator has to be dazzled twice for one image reading operation).

SUMMARY OF THE INVENTION

An object of the present invention is to provide an image reading device capable of reading an image without giving an operator any discomfort by dazzlement and consequently being comfortably operated.

One aspect of the present invention is directed to an image reading device, comprising a contact glass on which a document is to be placed; a group light source in which a plurality of point light sources are linearly arrayed; and a light source unit having the group light source mounted therein and adapted to optically scan a document surface via a contact glass with reading lights emitted from the group light source, the group light source being constructed such that at least one of the plurality of point light sources is a detecting light source for emitting a detection light toward the contact glass to detect the presence or absence of a document on the contact glass.

These and other objects, features, aspects and advantages of the present invention will become more apparent upon a reading of the following detailed description and accompanying drawings.

BRIEF DESCRIPTION OF THE DRAWINGS

FIG. 6 is a flow chart showing the reading of a document image in accordance with a control of the controller.

DETAILED DESCRIPTION OF THE PREFERRED EMBODIMENTS

Figure 1:
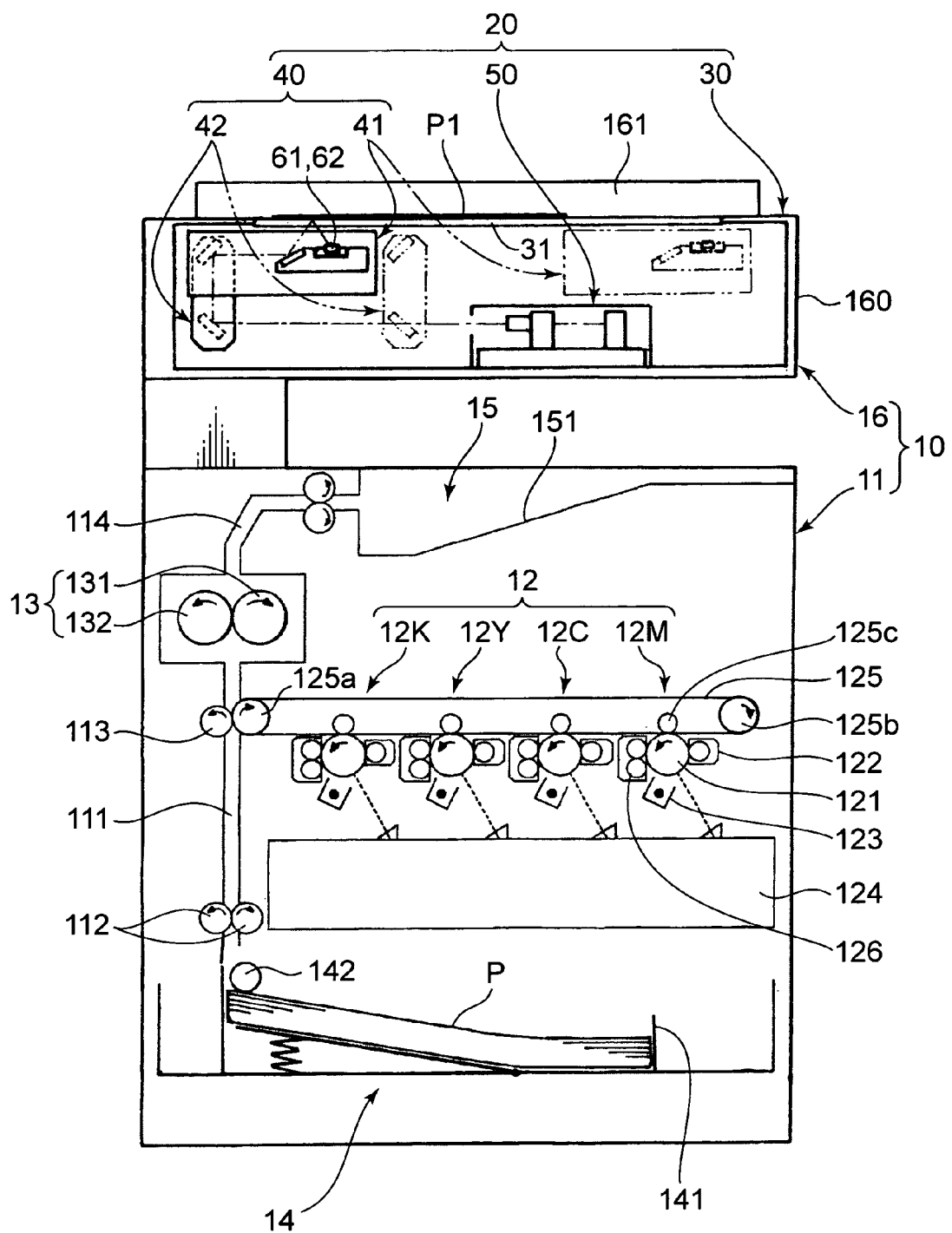
FIG. 1 is an entire construction diagram schematically showing an image forming apparatus to which an image reading device according to one embodiment of the invention is applied.

FIG. 1 is an entire construction diagram schematically showing an image forming apparatus to which an image reading device according to one embodiment of the present invention is applied. As shown in FIG. 1, an image forming apparatus 10 is used as a copier and has a basic construction provided with a box-shaped apparatus main body 11 referred to as an internal sheet discharging type, and an image reader 16 arranged atop the apparatus main body 11 for reading a document image.

An optical unit 20 as the image reading device is mounted in the image reader 16. An image forming assembly 12 for forming an image based on the image information of a document read by the optical unit 20, a fixing assembly 13 for fixing the image formed and transferred to a sheet P by the image forming assembly 12, and a sheet storing assembly 14 for storing copy sheets are arranged in the apparatus main body 11. A sheet discharging portion 15 provided with an internal sheet discharge tray 151 for receiving the discharged sheet P having the image fixed thereto is arranged in a top part of the apparatus main body 11.

The image reader 16 includes an external cover 160 for enclosing the optical unit 20 having a contact glass 31 on the upper surface thereof, and a document mat (document pressing member) 161 for pressing a document placed on the contact glass 31 is openably and closably provided on the external cover 160. Such a document mat 161 can be turned in forward and reverse directions about a hinge axis of a pair of hinge members 162 (see FIG. 2) provided at rear positions of the upper surface of the external cover 160 (at back side when viewed from a position where an operator operates) and is displaceable between a closing posture T1 for closing the upper surface of the contact glass 31 and an opening posture T2 for exposing the upper surface of the contact glass 31.

A document mat opening sensor 163 for detecting that the document mat 161 is set in the closing posture T1 with the document 161 closed is provided at a specified position of the upper surface of the external cover 160 facing the base end (side where the hinge members 162 are provided) of such a document mat 161. The setting of the document mat 161 to the closing posture T1 is detected when this document mat opening sensor 163 is turned on, whereas the setting of the document 161 to the opening posture T2 is detected when the document mat opening sensor 163 is turned off.

The optical unit 20 reads a document image via the contact glass 31 from below the contact glass 31 with a document placed on the contact glass 31 pressed by the document mat 161. The image information of the document read by the image reader 16 is outputted to the image forming assembly 12 after specified processings are applied thereto.

An operation panel 17 operated to enter process conditions relating to the document reading and the copying operation is provided at a specified position of the external cover 160, i.e. at a position (position at one end with respect to an aligned direction of a plurality of unit LEDs 61 to be described later) on a front portion of the image forming apparatus 10 in this embodiment. An LCD (liquid crystal display) 18 as output (display) means is provided adjacent to this operation panel 17. On the operation panel 17 are arranged a power switch 171, a start key (image reading start key) 172 for starting an operation of reading a document image, a cancel key 173 for canceling the document image reading operation set once, an energy-saving selection key 174 for selecting an energy-saving mode (power-saving mode) to save power consumption, a numeric pad 175 used to enter the number of copies to be made on sheets P and the like. An image forming operation is performed by operating these switches and keys. Various comments relating to the image forming operation, control results and the like are outputted to and displayed on the LCD 18.

When the energy-saving selection key 174 is pressed, the power source is turned off while leaving only maintenance power (standby power), thereby preventing unnecessary power from being consumed while the image forming apparatus 10 is not in operation. In such a case, the energy-saving mode is specifically set, for example, by a control signal outputting section 713 having a mode setting function for setting this mode. In the energy-saving mode, only minimum necessary power (maintenance power) is supplied to the respective parts of the image forming apparatus 10. When the energy-saving mode selection key 174 is pressed again with the energy-saving mode set, the energy-saving mode is canceled (removed) to return to an ordinary operation mode.

The image forming assembly 12 is for forming a toner image on a sheet fed from the sheet storing assembly 14, and is provided with a magenta unit 12M, a cyan unit 12C, a yellow unit 12Y and a black unit 12K successively arranged from an upstream side (right side on the plane of FIG. 1) to a downstream side in this embodiment.

Each of the units 12M, 12C, 12Y, 12K includes a photoconductive drum 121 and a developing device 122. Each photoconductive drum 121 receives the supply of toner from the corresponding developing device 122 while being rotated in counterclockwise direction in FIG. 1. To each developing device 122 is supplied toner from an unillustrated corresponding toner cartridge arranged at the front side of the apparatus main body 11 (front side of the plane of FIG. 1).

A charger 123 is disposed at a position right below each photoconductive drum 121, and an exposing device 124 is disposed at a position below this charger 123. The respective photoconductive drums 121 have the outer circumferential surfaces thereof uniformly charged by the corresponding chargers 123, and laser beams corresponding to the respective colors based on an image data read by the image reader 16 are emitted to the charged outer circumferential surfaces of the photoconductive drums 121 by the corresponding exposing devices 124, whereby electrostatic latent images are formed on the outer circumferential surfaces of the respective photoconductive drums 121. Toners are supplied to such electrostatic latent images from the developing devices, thereby forming toner images on the outer circumferential surfaces of the photoconductive drums 121.

Above the photoconductive drums 121, a transfer belt 125 is so mounted between a drive roller 125*a* and a driven roller 125*b* as to touch the respective photoconductive drums 121. This transfer belt 125 turns between the drive roller 125*a* and the driven roller 125*b* in synchronism with the respective photoconductive drums 121 while being pressed against the outer circumferential surfaces of the photoconductive drums 121 by transfer rollers 125*c* disposed in correspondence with the photoconductive drums 121.

Accordingly, as the transfer belt 125 is turned, the magenta toner image of the magenta unit 12M is transferred to the outer surface of the transfer belt 125 by the photoconductive drum 121. Subsequently, the cyan toner image is transferred to the same position of the transfer belt 125 in a superimposed manner by the photoconductive drum 121 of the cyan unit 12C. Subsequently, the yellow toner image is transferred to the same position of the transfer belt 125 in a superimposed manner by the photoconductive drum 121 of the yellow unit 12Y. Finally, the black toner image is transferred to the same position of the transfer belt 125 in a superimposed manner by the photoconductive drum 121 of the black unit 12K. In this way, a color toner image is formed on the outer surface of the transfer belt 125. The color toner image formed on the outer surface of the transfer belt 125 is transferred to a sheet P conveyed from the sheet storing assembly 14.

A cleaning device 126 for cleaning the outer circumferential surface of the photoconductive drum 121 by removing the residual toner is disposed at a position to the left of each photoconductive drum 121 in FIG. 1. The outer circumferential surface of each photoconductive drum 121 cleaned by the corresponding cleaning device 126 is moved toward the position of the corresponding charger 123 for a new charging operation.

The waste toner removed from the outer circumferential surface of each photoconductive drum 121 by the corresponding cleaning device 126 is collected into a corresponding unillustrated toner collection bottle through a specified path to be stored therein.

A vertically extending feeding conveyance path 111 is formed at a position to the left of the image forming assembly 12 in FIG. 1. A pair of conveyance rollers 112 is provided at a specified position of this feeding conveyance path 111, and a sheet from the sheet storing assembly 14 is conveyed toward the transfer belt 125 mounted on the drive roller 125*a* by driving the pair of conveyance rollers 112. A second transfer roller 113 held in contact with the outer surface of the transfer belt 125 is disposed on such a feeding conveyance path 111 at a position facing the drive roller 125*a*, and the color toner image on the transfer belt 125 is transferred to the sheet P being conveyed along the feeding conveyance path 111 and pressingly held between the transfer belt 125 and the second transfer roller 113.

An unillustrated cleaning device for the transfer belt for removing the residual toner on the outer surface of the transfer belt 125 is disposed at the right end of the transfer belt 125 in FIG. 1. The transfer belt 125 having the color toner image transferred to the sheet P is turned for a next image transferring operation with the residual toner on the outer surface thereof removed and cleaned by this cleaning device.

The fixing assembly 13 is for fixing the toner image on the sheet P having transferred in the image forming assembly 12, and is comprised of a fixing roller 131 provided internally with an electric heating element as a heating source and a pressure roller 132 opposed to the fixing roller 131 at the left side of FIG. 1. The sheet P having the toner image transferred thereto and coming from the image forming assembly 12 via the second transfer roller 113 has the toner image fixed thereto by a heating process by the fixing roller 131 while being pressingly held between the fixing roller 131 and the pressure roller 132, whereby a stable color image is formed on the sheet P.

The color-printed sheet P finished with the image fixing operation is discharged toward the internal sheet discharge tray 151 provided in the apparatus main body 11 through a discharging conveyance path 114 extending from an upper part of the fixing assembly 13.

The sheet storing assembly 14 includes a sheet tray 141 detachably mountable into the apparatus main body 11 at a position below the exposing devices 124. A stack of sheets are stored in the sheet tray 141. Sheets P are dispensed one by one from the sheet stack stored in the sheet tray 141 by driving a pickup roller 142 and introduced to the image forming assembly 12 via the feeding conveyance path 111.

Figure 2:
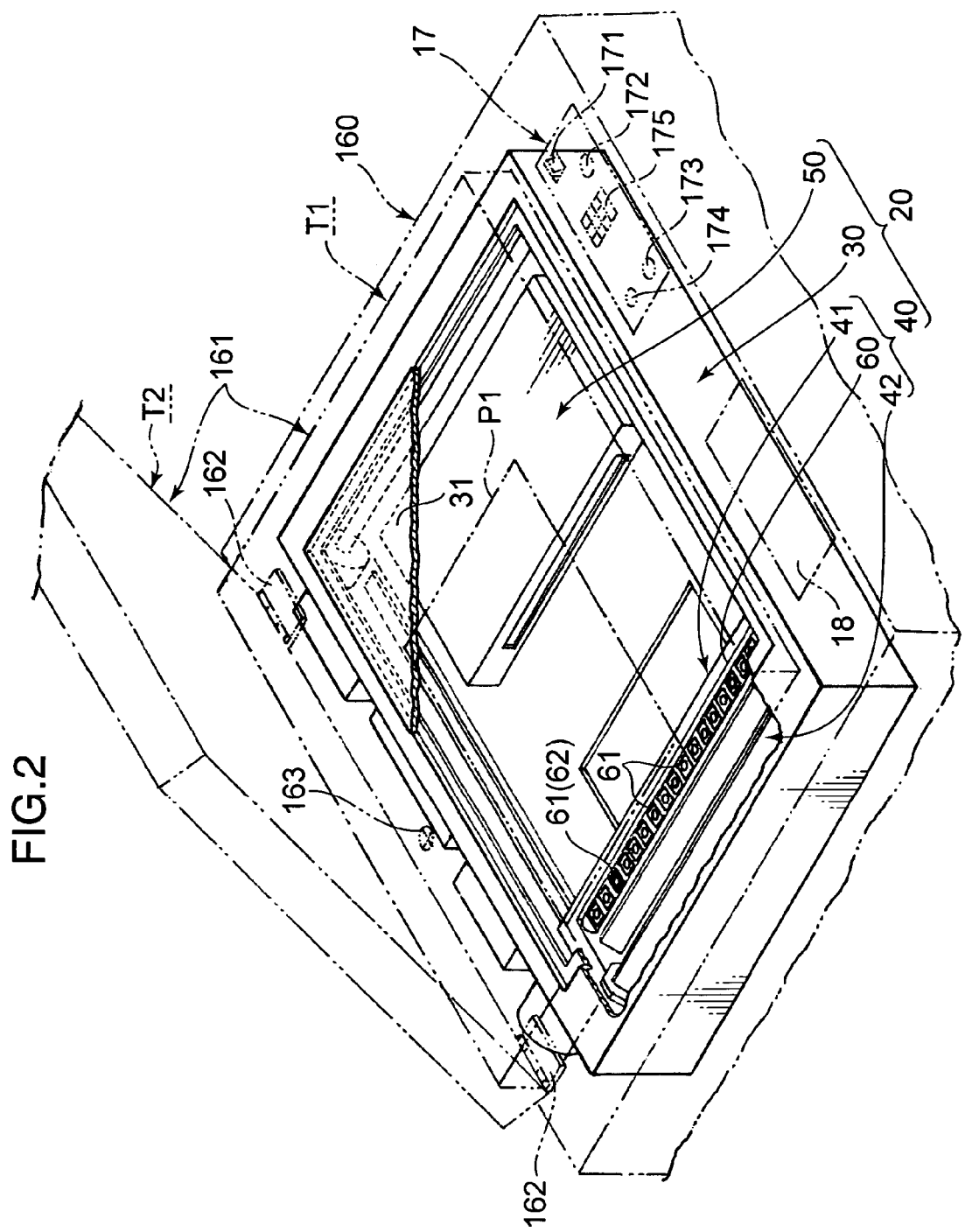
FIG. 2 is a perspective view partly cut away showing one construction example of an optical unit shown in FIG. 1.
Figure 3:
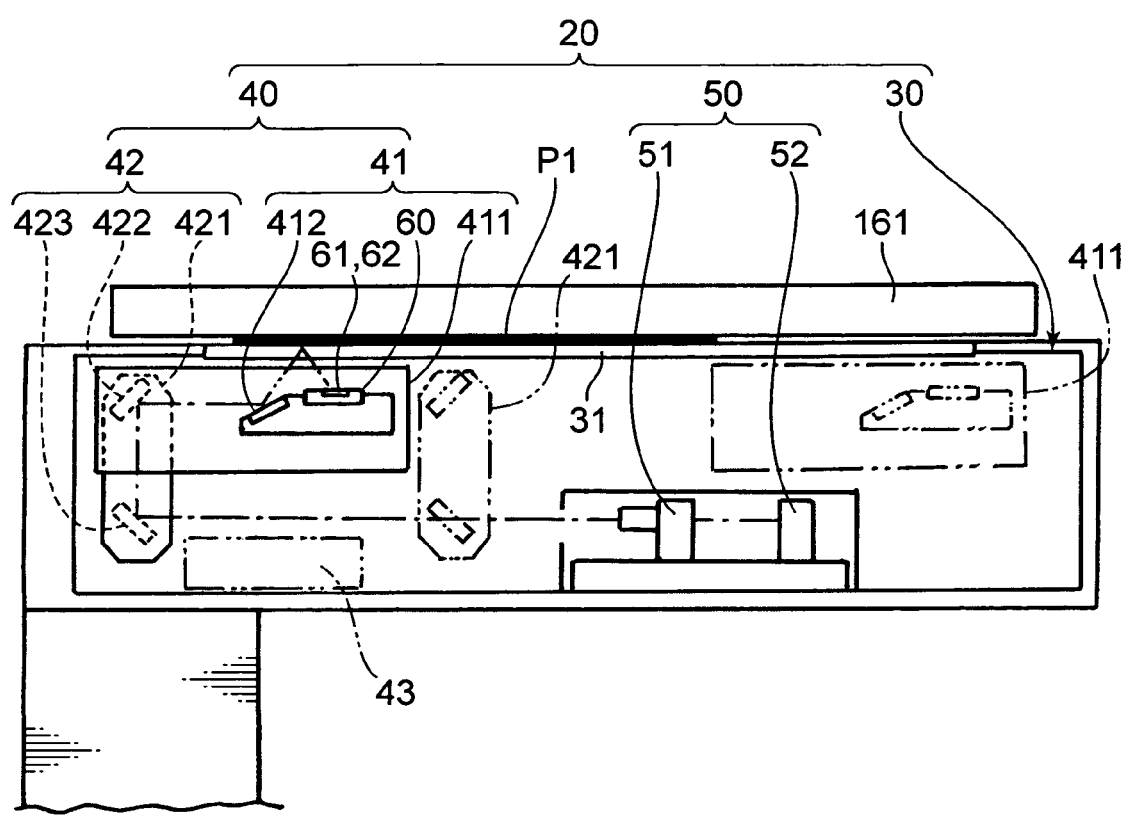
FIG. 3 is a side view in section of the optical unit shown in FIG. 2.
Figure 4:
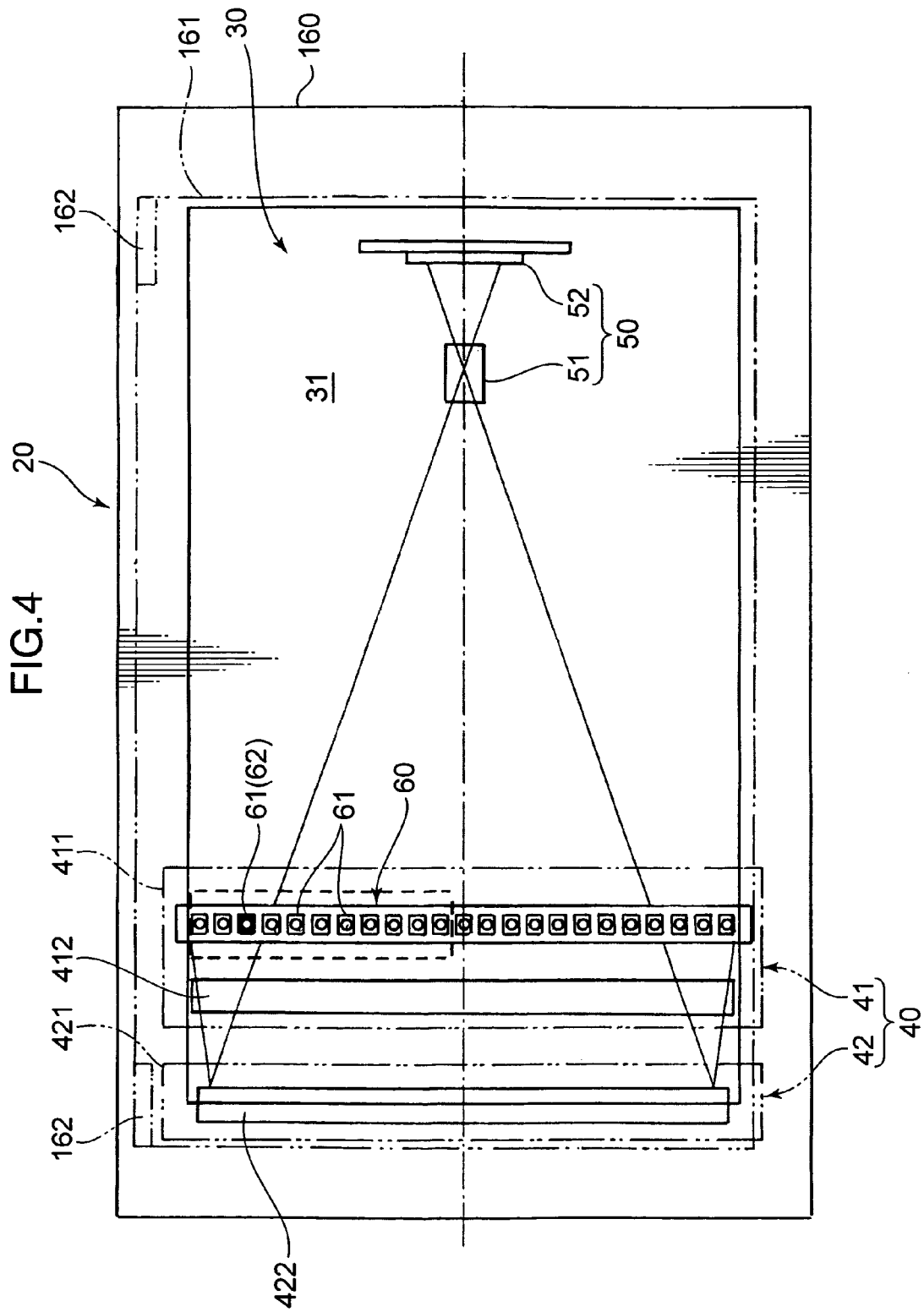
FIG. 4 is a plan view in section of the optical unit shown in FIG. 2.

FIG. 2 is a perspective view partly cut away showing one construction example of the optical unit 20, FIG. 3 is a front view in section of the optical unit 20 shown in FIG. 2, and FIG. 4 is a plan view in section of the optical unit 20 shown in FIG. 2. The optical unit (image reading device) 20 according to the present invention is described with reference to FIGS. 2 to 4 and, if necessary, also to FIG. 1.

As shown in these figures, the optical unit 20 has a basic construction provided with a box-shaped casing 30, a reading unit 40 mounted in this casing 30 in such a manner as to be movable back and forth along the transverse direction of FIG. 1 and capable of emitting a light to a document surface and obtaining a resulting reflected light, and a CCD unit 50 for condensing the reflected light from the reading unit 40 and importing it as an image data.

The outer shape of the casing 30 is set such that the casing 30 can be accommodated in the external cover 160 of the image reader 16. A large rectangular opening is formed in the middle of the upper surface of such a casing 30, and the contact glass 31 on which a document is to be placed is fitted in this opening. This contact glass 31 is so positioned as to face an opening formed in the upper surface of the external cover 160 of the image reader 16 with the optical unit 20 mounted in the image reader 16.

The reading unit 40 is constructed to move to right from a position (home position) slightly distanced to right from the left end of FIG. 3 to scan a document surface of a document placed on the contact glass 31 and then to return to the home position. Such a reading unit 40 includes a light source unit 41 for emitting a light toward the document surface and a mirror unit 42 for reflecting the light from the light source unit 41 reflected by the document surface in such a manner as to propagate along a light path and introducing the light to the CCD unit 50.

The light source unit 41 is comprised of a first scanning frame 411 movable back and forth along the transverse direction of FIG. 3 and elongated in transverse direction in front view, a light source member (light source) 60 supported in this first scanning frame 411 and elongated in horizontal direction normal to a traveling direction of the first scanning frame 411, and a first mirror 412 for reflecting a light emitted from the light source member 60 and reflected by the document surface toward the left side of FIG. 3.

The light source member 60 is formed by juxtaposing a plurality of unit LEDs (point light sources) 61 formed by LEDs (light-emitting diodes) in a specified frame. Lights emitted from the respective unit LEDs 61 are reflected by a document surface of a document P1 via the contact glass 31 by turning such unit LEDs 61 at once. The lights from the light source member 60 reflected by the document surface of the document P1 are reflected toward the left side of FIG. 3 by the first mirror 412.

The mirror unit 42 is arranged at the left side of the light source unit 41 in FIG. 3, and is comprised of a second scanning frame 421 movable back and forth along transverse direction, and a second mirror 422 and a third mirror 423 supported in the second scanning frame 421. As shown in FIG. 3, the second scanning frame 421 is vertically long in front view, and the upper end position thereof is set substantially at the same level at the upper end position of the light source unit 41, whereas the bottom end position thereof is located below the bottom end position of the light source unit 41. The second mirror 422 is designed to reflect the light reflected by the first mirror 412 downward, whereas the third mirror 423 is opposed to the second mirror 422 from below and designed to reflect the light reflected by the second mirror 422 to the right side of FIG. 3.

The light reflected by the third mirror 423 is inputted to the CCD unit 50, in which, after a light signal is converted into an electrical signal, an analog quantity of the electrical signal is converted into a digital quantity as image information.

The light source unit 41 and the mirror unit 42 are moved at different speeds while being interlocked with each other by the driving of a scanning frame driving mechanism 43 including an unillustrated drive motor and a traveling wire stretching between specified pulley tubes. Specifically, the light source unit 41 is moved at twice the speed of the mirror unit 42, a distance of a light path from the first mirror 412 to the CCD unit 50 via the second and third mirrors 422, 423 is kept constant regardless of whether the reading unit 40 is located at the home position shown in solid line in FIG. 1 or moved to an arbitrary position shown by chain double-dashed line in FIG. 1. Thus, the reflected light from the document surface is inputted to the CCD unit 50 under the same conditions regardless of at which position the reading unit 40 is located.

The CCD unit 50 includes a lens unit 51 formed by combining a plurality of lenses and a CCD (charge coupled device) 52 that functions as an image sensor and is opposed to the lens unit 51 at the right side in FIG. 1. The lens unit 51 is for condensing the reflected light of the light from the light source member 60 and imaging it on the CCD (image sensor) 52, and the CCD 52 is for converting the intensity of the light inputted from the lens unit 51 into an electrical signal as a digital quantity.

The image information of the document converted into the digital quantity in the CCD 52 is outputted to the exposing devices 124 of the image forming assembly 12 after being temporarily saved in a specified storage device, and the exposing devices 124 emit lights having intensities corresponding to the document image to the photoconductive drums 121 based on this digital information.

In the present invention, one of a plurality of unit LEDs 61 juxtaposed in the light source member 60 serves as a document presence detecting LED (document presence detecting light source) 62 for detecting whether or not the document P1 is present on the contact glass 31. This document presence detecting LED 62 is constantly kept on (in this case, a blinking state is included in a turned-on state) when the power switch 171 is on.

Specifically, all the other unit LEDs 61 but the document presence detecting LED 62 are turned on when the document P1 is placed on the contact glass 31 with the document mat 161 set in the opening posture T2 and the start key 172 is pressed with the document mat 161 successively returned to the closing posture T1, thereby being used to scan the document surface through the movement of the reading unit 40, and are turned off when the scanning is completed. On the contrary, the document presence detecting LED 62 is constantly kept on to detect whether or not the document P1 is present on the contact glass 31.

In the present invention, such a document presence detecting LED 62 is provided at a side at least backward (side where the center of rotation of the document mat 161 is located (i.e. side where the hinge members 162 are provided), an area shown by thick dotted line in FIG. 4) of the longitudinal center (shown by chain line in FIG. 4) of the light source member 60. In this embodiment, for example, the third unit LED 61 from the end of the light source member 60 at the side of the hinge members 162 is employed as the document presence detecting LED 62 as shown in FIGS. 2 and 4 (document presence detecting LED 62 doubles as the unit LED 61 for reading a document image). It should be noted that the document presence detecting LED may not be comprised of one LED. In short, the document presence detecting LED may be comprised of a suitable smaller number of unit LEDs 61 than the total number of the unit LEDs 61, e.g. two or three (plural) LEDs (a plurality of LEDs corresponding to the document presence detecting LED 62 may also be provided).

Accordingly, the light emitted from the document presence detecting LED 62 constantly kept on is reflected regardless of whether the document mat 161 is set in the closing posture T1 or in the opening posture T2. This reflected light is introduced to the CCD unit 50 after being reflected by the first mirror 412, the second mirror 422 and the third mirror 423, thereby being imaged on the CCD 52.

If the document P1 is placed on the contact glass 31, the light from the document presence detecting LED 62 becomes a reflected light reflected by the document surface of the document P1. On the contrary, the light from the document presence detecting LED 62 becomes a reflected light by the underside of the document mat 161 if no document P1 is present on the contact glass 31 or becomes a very weak reflected light since most of the light passes through the contact glass 31 if the document mat 161 is fully opened. Accordingly, whether or not the document P1 is present on the contact glass 31 can be known by inputting the reflected light of the light emitted by the document presence detecting LED 62 to the CCD 52 and discriminating a digital value converted by the CCD 52 and representing the intensity of this reflected light by means of a controller 70 to be described later.

In the present invention, the controller 70 including a microcomputer for executing various controls is employed at a specified position of the image forming apparatus 10, and part of this controller 70 executes controls based on the presence or absence of the document P1 on the contact glass 31.

Figure 5:
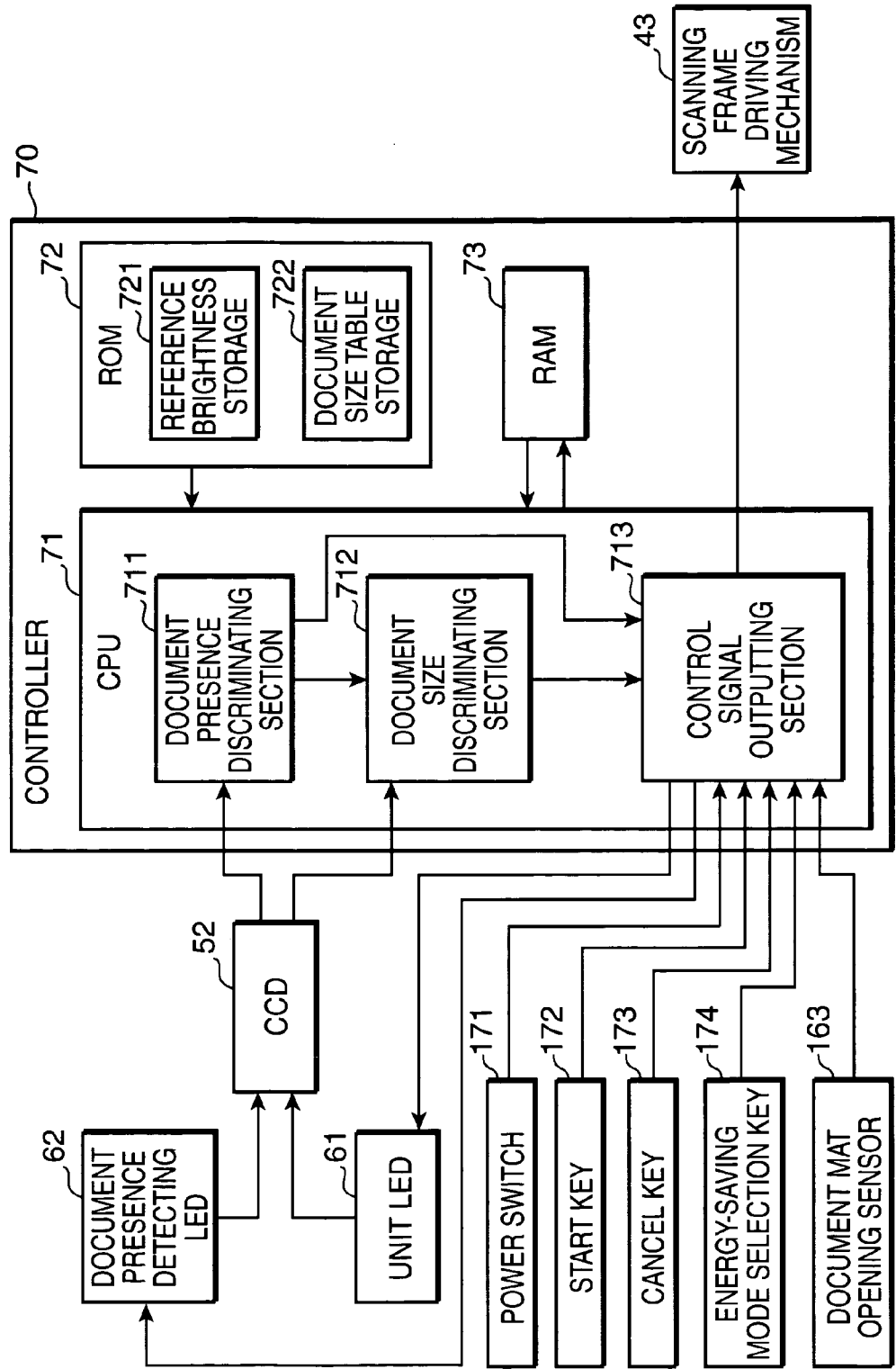
FIG. 5 is a block diagram of one construction example of a controller mainly showing functional sections relating to detection as to the presence or absence of a document.

FIG. 5 is a block diagram of one construction example of the controller 70 mainly showing functional sections relating to the detection of the presence or absence of the document P1. As shown in FIG. 5, the controller 70 has a basic construction provided with a CPU (central processing unit) 71 as an arithmetic processing unit, a ROM (read-only memory) 72 as a read only storage device attached to the CPU 71, and a RAM (random access memory) 73 in and from which information can be freely written and read and which is attached to the CPU 71.

A program for causing the CPU 71 to operate, invariant data and the like are stored in the ROM 72, whereas the RAM 73 is used as an area for temporarily saving various data used during the control process.

The CPU 71 includes a document presence discriminating section 711 for discriminating the presence or absence of the document P1 on the contact glass 31, a document size discriminating section 712 for discriminating the size of the document P1 after the document presence discriminating section discriminated the presence of the document P1, and a control signal outputting section 713 for outputting a control signal to a specified device in accordance with command signals from the document presence discriminating section 711 and the document size discriminating 712.

A digital data relating to the presence or absence of the document P1 and converted by the CCD 52 (specifically, digital data representing brightness (brightness data)) when the light emitted from the document presence detecting LED 62 and reflected by the document P1 is inputted to the CCD 52 is inputted to the document presence discriminating section 711.

On the other hand, a reference brightness storage 721 is provided in the ROM 72. A brightness range of the reflected light in the case where the document P1 is present on the contact glass 31 is stored in this reference brightness storage. Every time the brightness data is inputted from the CCD 52, the document presence discriminating section 711 compares a value of this brightness data and values of the reference brightness stored in the reference brightness storage 721 and discriminates the presence of the document P1 on the contact glass 31 if the brightness data lies within the reference brightness range while discriminating the absence of the document P1 on the contact glass 31 if the brightness data lies outside the reference brightness range.

In the case of discriminating the presence of the document P1 on the contact glass 31, the document presence discriminating section 711 sends such a content to the document size discriminating section 712 and outputs a command signal to the control signal outputting section 713, which in turn outputs a control signal for driving a specified device (e.g. for turning all the unit LEDs 61 on after the start key 172 is pressed).

Upon the input of the signal representing the presence of the document P1 on the contact glass 31 from the document presence discriminating section 711, the document size discriminating section 712 discriminates the size of the document P1 based on the digital data (size data) relating to the size of the document P1 and inputted from the CCD 52 on the condition that all the unit LEDs 61 were turned on by the control signal from the control signal outputting section 713. The size data relates to the brightness of the reflected lights of the lights emitted from the respective unit LEDs 61.

On the other hand, a document size table storage 722 storing a table relating the combinations of the unit LEDs 61 corresponding to the respective documents P1 and size reference data of the documents P1 is provided in the ROM 72. The document size discriminating section 712 discriminates the size of the document P1 currently placed on the contact glass 31 by comparing the size data inputted from the CCD 52 with the size reference data of the documents P1 stored in the document size table storage 722.

The control signal outputting section 713 outputs control signals to the unit LEDs 61 and the document presence detecting LED 62 based on an operation of pressing the power switch 171, the start key 172, the cancel key 173 or the like and command signals from the document presence discriminating section 711 and the document size discriminating section 712, and the like, thereby turning the unit LEDs 61 and the document presence detecting LED 62 on. The control signal outputting section 713 also outputs a control signal to the scanning frame driving mechanism 43, and the document surface of the document P1 is scanned through the movement of the reading unit 40 driven by the scanning frame driving mechanism 43 having received this control signal.

Such a control of reading the image of the document P1 by the controller 70 is described below with reference to FIG. 6. FIG. 6 is a flow chart showing an operation of reading the document P1 in accordance with the control of the controller 70. As shown in FIG. 6, the document presence detecting LED 62 is turned on by a control signal from the control signal outputting section 713 (Step S2) when the power switch 171 is pressed (turned on) in Step S1.

Subsequently, whether or not the power switch 171 has been turned off is discriminated in Step S20, and the control is immediately ended if the power switch 171 has been turned off while Step S3 follows unless otherwise. The document presence detecting LED 62 is kept on until discrimination is made as to whether or not the document presence detecting LED 62 is to be turned off for energy saving in Step S14 unless the power switch 171 is turned off in Step S20.

In Step S3, whether or not the document P1 is present on the contact glass 31 is discriminated by the document presence discriminating section 711. This discrimination is made by the document presence discriminating section 711 by comparing the brightness data inputted from the CCD 52 and the reference brightness stored in the reference brightness storage 721 of the ROM 72. If the document P1 is discriminated to be present on the contact glass 31 (YES in Step S3), it is discriminated whether or not the document mat 161 set to the opening posture T2 by being opened has been displaced from the opening posture T2 to the closing posture T1 by being closed to press the document P1 (i.e. whether or not the document mat opening sensor 163 has been turned on is discriminated by the control signal outputting section 713).

If the document mat opening sensor 163 is on (YES in Step S4), the control signal from the control signal outputting section 713 is outputted to all the unit LEDs 61, thereby turning all the unit LEDs 61 on, and lights emitted from the unit LEDs 61 and reflected by the document surface are inputted to the CCD 52, whereby a size data (brightness data of the lights emitted from the respective unit LEDs 61 and reflected by the document surface of the document P1 currently present on the contact glass 31) is inputted from the CCD 52 to the document size discriminating section 712.

The document size discriminating section 712 having receiving this size data compares this size data with the table stored in the document size table storage 722 of the ROM 72 for determining the size of the document P1, thereby discriminating the size of the document P1 placed on the contact glass 31 (Step S5). After this discrimination, all the unit LEDs 61 are turned off once.

If the start key 172 is successively pressed (YES in Step S6), the scanning frame driving mechanism 43 is driven with all the unit LEDs 61 turned on in response to the control signal from the control signal outputting section 713, whereby the reading unit 40 travels to scan the document surface with lights emitted from the unit LEDs 61 (Step S7).

On the other hand, if the document mat opening sensor 163 is not on in Step S4 (NO in Step S4), i.e. if the document mat 161 having been opened once has not be closed yet, the document mat 161 is kept in the opening posture T2. If the start key 172 is pressed in this state (YES in Step S8), all the unit LEDs 61 are turned on despite the open state of the document mat 161 to discriminate the size of the document P1 (Step S9). Subsequently, Step S7 follows to scan the document surface. It should be noted that this routine returns to Step S4 unless the start key 172 is pressed in Step S8 (NO in Step S8).

If the absence of the document P1 on the contact glass 31 is discriminated in Step S3 (NO in Step S3), it is then discriminated whether or not the start key 172 has been pressed in Step S10. This routine returns to Step S20 unless the start key 172 has been pressed (NO in Step S10), whereas notification representing the absence of the document P1 on the contact glass 31 is displayed on the LCD 18 in response to a control signal from the control signal outputting section 713 (Step S11) if the start key 172 has been pressed despite the absence of the document P1 on the contact glass 31.

The reason for giving such notification is that it is wasteful for the reading unit 40 to perform the reading operation if the start key 172 is pressed by mistake despite the absence of the document P1 on the contact glass 31. Such a sentence "Is reading operation performed although no document is present?" can be cited as an example of the display output.

This routine returns to Step S20 if the cancel key 173 is pressed (YES in Step S12) after confirming the display output by the LCD 18, whereas this routine proceeds to Step S7 to perform the scanning operation by moving the reading unit 40 despite the absence of the document P1 on the contact glass 31 if the cancel key 173 is not pressed (NO in Step S12) and the start key 172 is pressed again (YES in Step S13).

Subsequently, after the energy-saving mode selection key 174 being pressed, the controller 70 discriminate whether or not the energy-saving mode is set in Step S14 upon the completion of the operation of scanning the document surface of the document P1 by the reading unit 40 in Step S7. If the energy-saving mode is set (YES in Step S14), the document presence detecting LED 62 is turned off (Step S15).

If the energy-saving mode is canceled, e.g. by pressing the energy-saving mode selection key 174 again (YES in Step S16), this routine returns to Step S2 to perform a next image reading operation after the document presence detecting LED 62 is turned on.

As described in detail above, the optical unit (image reading device) 20 according to the present invention includes the light source member 60 (group light source) that is a light source in which a plurality of unit LEDS 61 (point light sources) is linearly arrayed, and the light source unit 41 for optically scanning the document surface via the contact glass 31 with reading lights emitted from the light source member 60 to read the image of the document P1 placed on the contact glass 31, wherein the light source member 60 has the document presence detecting LED 62 (document presence detecting light source) that is at least one of the plurality of unit LEDs 61 and emits a detection light for detecting the presence or absence of the document P1 on the contact glass 31 toward the contact glass 31.

With this construction, the light source unit 41 optically scans the document surface via the contact glass 31 with the reading lights emitted from the light source member 60 (group light source) to read the image of the document P1 placed on the contact glass 31. The detection light for detecting the presence or absence of the document P1 on the contact glass 31 is emitted toward the contact glass 31 by the document presence detecting LED 62 that is at least one of the plurality of unit LEDs 61. Thus, as compared to a case where the presence or absence of the document P1 is detected by turning all the unit LEDs 61 on as before, dazzlement is remarkably reduced since the presence or absence of the document P1 is detected by turning only, for example, one document presence detecting LED 62 out of all the unit LEDs

61. Therefore, the image reading operation can be performed without giving dazzling discomfort to an operator (without making the operator dazzled), which in turn makes it possible to realize a comfortably operable image reading device (having improved operability) (to make the operating environment of the image reading device comfortable).

Further, the control signal outputting section 713 (light source controller) for controlling the light source member 60 (operations of turning the group light source on and off) is provided, and only the document presence detecting LED 62 of the light source member 60 is controlled to be constantly kept on by the control signal outputting section 713 in order to detect the presence or absence of the document P1 on the contact glass 31. Thus, the presence or absence of the document P1 on the contact glass 31 can be constantly detected by this document presence detecting LED 62 constantly kept on. Therefore, if no document P1 is present on the contact glass 31, a control can be executed not to turn all the unit LEDs 61 on, which can in turn prevent discomfort caused by dazzlement from being given to the operator.

Furthermore, the operation panel 17 (operating unit) used for the operation of the image reading device (image forming apparatus 10) is arranged at one end with respect to a direction of the linear array of the plurality of unit LEDs 61, and the document presence detecting LED 62 is arranged at the position closer to the other end than the middle position of the light source member 60 with respect to the direction of the linear array (position at the back side opposite to the operation panel 17). Thus, the document presence detecting LED 62 is arranged at the position more distant from the operator operating at the side of the operation panel 17, thereby giving even less discomfort caused by dazzlement to the operator.

Further, the document mat 161 (document pressing member) is provided which has the center of rotation at the one end with respect to the direction of the linear array of the plurality of unit LEDs 61 and is openable and closable relative to the contact glass 31 by the rotation thereof, and the document presence detecting LED 62 is arranged at the position closer to the center of rotation of the document mat 161 than the middle position of the light source member 60 with respect to the direction of the linear array. Thus, even if the document mat 161 having been opened is closed despite the absence of a document on the contact glass 31 and the document presence detecting LED 62 is accordingly turned on, the light from the document presence detecting LED 62 is blocked by the document mat 161 and the entry thereof into the operator's eyes can be effectively prevented since the document presence detecting LED 62 is provided at the position closer to the center of rotation of the document mat 161 than the middle one of the plurality of unit LEDs 61, i.e. at the position more distant from the operator.

Further, the CCD 52 (image sensor) is provided to which the reading lights emitted from all the unit LEDs 161 of the light source member 60 including the document presence detecting LED 62 and reflected by the document surface are inputted in the case of reading the image of the document P1, and to which the detection light emitted only from the document presence detecting LED 62 is inputted in the case of detecting the presence or absence of the document P1. Thus, the CCD 52 used to read the document image doubles as a sensor for detecting the presence or absence of the document P1, wherefore it is not necessary to provide an additional sensor exclusively used for detecting the presence or absence of the document and the number of parts can be accordingly reduced.

Furthermore, there are provided the document presence discriminating section 711 for discriminating the presence or absence of the document P1 based on the information of the detection light emitted from the document presence detecting LED 62 and the start key 172 (input instructing section) for giving an input instruction to start the operation of reading the image of the document P. Since the control signal outputting section 713 executes such a control not to turn all of the plurality of unit LEDs 61 on unless the input instruction is given by means of the start key 172 if the document presence discriminating section 711 has discriminated the absence of the document P1 on the contact glass 31 (i.e. all the unit LEDs 61 are turned on in the document surface scanning operation in Step S7, for example, if the input instruction is given in Step S13 of FIG. 6), there is no likelihood of turning all the LEDs 61 unless the input instruction is given by means of the start key 172 regardless of whether the document mat 161 is opened or closed, i.e. whether the document mat opening sensor 163 is on or off. Therefore, all the unit LEDs 61 are not immediately turned on even if the document mat 161 is closed, accordingly eliminating the likelihood of dazzling the operator.

Further, if the document presence discriminating section 711 has discriminated the absence of the document P1 on the contact glass 31, the control signal outputting section 713 (selecting section) makes such a selection as to whether or not the operation of reading the image of the document P1 is to be performed in response to the input instruction given by the start key 172. This realizes, for example, such a construction that the operator selects as to whether or not to perform the image reading operation if the start key 172 is pressed by mistake with no document P1 present on the contact glass 31. Thus, an error in the input instruction (operation) can be noticed at this point of time, wherefore the wasteful consumption of energy, i.e. the execution of the image reading operation despite the presence of the document, can be securely prevented.

Furthermore, the document size discriminating section 712 for discriminating the size of the document P1 is provided and the plurality of unit LEDs 61 of the light source member 60 are all turned on by the control signal outputting section 713 for the discrimination of the document size by the document size discriminating section 712. Thus, the light source member 60 enables not only the detection of the presence or absence of the document P by turning only the document presence detecting LED 62 and also the discrimination of the document size by turning all the unit LEDs 61 on.

Further, the document presence discriminating section 711 for discriminating the presence or absence of the document P1 based on the information of the detection light emitted from the document presence detecting LED 62 is provided, and the plurality of unit LEDs 61 of the light source member 60 are all turned on (e.g. operation in Step S5 of FIG. 6) to discriminate the document size only if the document presence discriminating section 711 has discriminated the presence of the document P1 on the contact glass 31 when the document mat 161 is displaced from the opening posture T2 to the closing posture T1 relative to the contact glass 31. This can prevent an occurrence of a situation where all the unit LEDs 61 are turned on when the document mat 161 is displaced from the opening posture T2 to the closing posture T1 (to discriminate the document size) despite the absence of the document P1 on the contact glass 31, thereby avoiding the unit LEDs 51 being wastefully turned on. This can accordingly contribute to a reduction in the energy cost.

Furthermore, a control signal outputting section 713 (mode setting section) for setting the power saving mode (energy saving mode) for saving the power consumption (by supplying only the minimum necessary maintenance power) is provided, and the document presence detecting LED 62 is turned off if the power saving mode is set by the control signal outputting section 713. This can alleviate a reduction (deterioration) in the light emitting performance of the document presence detecting LED 62 and can contribute to a reduction in the energy cost.

The present invention is not limited to the foregoing embodiment and also embraces the following contents.

(1) Although the copier is taken as an example of the image forming apparatus 10, to which the optical unit 20 is applied, in the foregoing embodiment, the image forming apparatus to which the optical unit 20 is applied is not limited to copiers according to the present invention and the optical unit 20 is also applicable to facsimile machines for electrically transmitting read image information to a remote place, scanners for reading image information and inputting it to a computer, and the like.

(2) Although the color printer is taken as an example of the image forming apparatus 10, to which the optical unit 20 is applied, in the foregoing embodiment, the present invention is not limited to the image forming apparatus 10 for color printing and is also applicable to image forming apparatuses for so-called single-color printing using only black.

This application is based on patent application No. 2005-369969 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image reading device, comprising:
   a contact glass on which a document is to be placed,
   a group light source in which a plurality of point light sources are linearly arrayed,
   a light source unit having the group light source mounted therein and adapted to optically scan a document surface via the contact glass with reading lights emitted from the group light source, and
   a size discriminating section for discriminating the size of the document, wherein
   the group light source being constructed such that at least one of the plurality of point light sources is a detecting light source for emitting a detection light toward the contact glass to detect the presence or absence of a document on the contact glass before the size discriminating section discriminates the size of the document.

2. The image reading device according to claim 1, further comprising a document pressing member having the center of rotation at one end with respect to a direction of the linear array of the plurality of point light sources and openable and closable relative to the contact glass by the rotation thereof, wherein the detecting light source is arranged at a position closer to the side of the center of rotation than to a middle position of the group light source with respect to the direction of the linear array.

3. An image reading device comprising:
   a contact glass on which a document is to be placed,
   a group light source in which a plurality of point light sources are linearly arrayed,
   a light source unit having the group light source mounted therein and adapted to optically scan a document surface via a contact glass with reading lights emitted from the group light source,
   the group light source being constructed such that at least one of the plurality of point light sources is a detecting light source for emitting a detection light toward the contact glass to detect the presence or absence of a document on the contact glass, and
   a light source controller for controlling the group light source, wherein the light source controller keeps only the detecting light source constantly on to detect the presence or absence of a document on the contact glass.

4. The image reading device according to claim 3, further comprising an image sensor, wherein reflected lights by the document surface of the reading lights emitted from all the point light sources of the group light source including the detecting light source are inputted to the image sensor in the case of reading an image of the document, and the detecting light emitted only from the detecting light source is inputted to the image sensor in the case of detecting the presence or absence of the document.

5. The image reading device according to claim 3, further comprising:
   a document discriminating section for discriminating the presence or absence of the document based on the information of a detecting light emitted from the detecting light source, and
   an input instructing section for giving an input instruction to start a document image reading operation,
   wherein the light source controller does not turn all of the plurality of point light sources on unless the input instruction is given by the input instructing section if the absence of the document on the contact glass has been discriminated by the document discriminating section.

6. The image reading device according to claim 5, further comprising a selecting section for making a selection as to whether the document image reading operation is to be performed in response to the input instruction given by the input instructing section if the absence of the document on the contact glass has been discriminated by the document discriminating section.

7. The image reading device according to claim 3, further comprising a size discriminating section for discriminating the size of the document, wherein the light source controller turns on all of the plurality of point light sources of the group light source for the discrimination of the document size by the size discriminating section.

8. The image reading device according to claim 7, further comprising a document discriminating section for discriminating the presence or absence of the document based on the information of a detecting light emitted from the detecting light source, wherein the light source controller turns on all of the plurality of point light sources of the group light source for the discrimination of the document size only if the presence of the document on the contact glass has discriminated by the document discriminating section when the document pressing member is displaced from the opening posture to the closing posture relative to the contact glass.

9. The image reading device according to claim 3, further comprising a mode setting section for setting a power-saving mode to save power consumption, wherein the light source controller turns the detecting light source off if the power-saving mode is set by the mode setting section.

10. An image reading device comprising:
    a contact glass on which a document is to be placed, a group light source in which a plurality of point light sources are linearly arrayed, a light source unit having the group light source mounted therein and adapted to optically scan a document surface via a contact glass with reading lights emitted from the group light source, the group light source being constructed such that at least one of the plurality of point light sources is a detecting light source for emitting a detection light toward the contact glass to detect the presence or absence of a document on the contact glass, and an operating unit arranged at one end of a direction of the linear array of the plurality of point light sources and used to operate the image reading device, wherein the detecting light source is arranged at a position closer to the other end of the light source than to a middle position thereof with respect to the direction of the linear array.

* * * * *